US007137542B2

(12) United States Patent
Oki et al.

(10) Patent No.: US 7,137,542 B2
(45) Date of Patent: Nov. 21, 2006

(54) VIBRATION ISOLATING HANDLE

(75) Inventors: Sadaharu Oki, Anjo (JP); Yoshio Sugiyama, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/938,474

(22) Filed: Sep. 10, 2004

(65) Prior Publication Data

US 2005/0087353 A1 Apr. 28, 2005

(30) Foreign Application Priority Data

Sep. 10, 2003 (JP) ............................ 2003-318289
Jul. 15, 2004 (JP) ............................ 2004-208463

(51) Int. Cl.
*H02K 7/00* (2006.01)
*E05B 3/00* (2006.01)

(52) U.S. Cl. .............................. 227/162.2; 227/162.1; 16/111

(58) Field of Classification Search ............ 173/162.2, 173/162.1; 16/431; 74/531, 551.2, 491
See application file for complete search history.

(56) References Cited

U.S. PATENT DOCUMENTS 4,287,785 A * 9/1981 Hunt .......................... 74/488
4,667,749 A * 5/1987 Keller ..................... 173/162.2
4,749,049 A * 6/1988 Greppmair ............... 173/162.2
4,936,394 A 6/1990 Ohtsu et al.
5,157,807 A 10/1992 Keller et al.
5,170,532 A * 12/1992 Holmin et al. ................ 16/431
5,749,421 A * 5/1998 Johansson et al. ....... 173/162.2
5,893,295 A * 4/1999 Bronnert ...................... 74/488
D411,426 S * 6/1999 Morita ......................... D8/69
D447,032 S * 8/2001 Schoen et al. ................. D8/67
6,394,885 B1 * 5/2002 Georgiou .................... 451/359
D463,238 S * 9/2002 Schoen et al. ................. D8/70
D467,484 S * 12/2002 Schoen et al. ................. D8/70
D492,177 S * 6/2004 Wright et al. .................. D8/70
6,978,694 B1 * 12/2005 Peppard ....................... 74/489
2001/0011846 A1 8/2001 Krondorfer et al.
2003/0037937 A1 * 2/2003 Frauhammer et al. ........ 173/48

(Continued)

FOREIGN PATENT DOCUMENTS

DE 10036078 A1 2/2002

(Continued)

OTHER PUBLICATIONS

European Search Report for Application No. 04021365.4-2316, dated Jul. 21, 2006.

*Primary Examiner*—Rinaldi I. Rada
*Assistant Examiner*—Brian Nash
(74) *Attorney, Agent, or Firm*—Lahive & Cockfield, LLP; Anthony A. Laurentano, Esq.

(57) ABSTRACT

It is an object of the invention to provide a vibration reducing technique which is effective in obtaining stable vibration reducing effectiveness. A representative vibration isolating handle may include a body, a grip part and an elastic member. The handle body is provided to be attachable to the power tool. The grip part is connected to the handle body such that the grip part can move relatively with respect to the handle body substantially in the same direction at least as vibration of the power tool. The elastic member is provided between the handle body and the grip part. The elastic member applies a biasing force to the grip part when the grip part moves. According to the invention, vibration of the grip part can be reduced by the vibration absorbing function of the elastic member with stability regardless of whether the force of the user gripping the grip part is large or small.

23 Claims, 15 Drawing Sheets

U.S. PATENT DOCUMENTS

| | | | |
|---|---|---|---|
| 2003/0132016 | A1 | 7/2003 | Meixner et al. |
| 2004/0107789 | A1 * | 6/2004 | Peppard .................... 74/484 R |
| 2002/0197939 | A1 | 3/2005 | Frauhammer et al. |

FOREIGN PATENT DOCUMENTS

| | | |
|---|---|---|
| GB | 2080920 | 2/1982 |
| JP | 61-6343 | 2/1986 |
| JP | 7-289673 | 11/1995 |
| JP | 2001-088059 | 4/2001 |
| WO | WO-03/043785 A1 | 5/2003 |

* cited by examiner

FIG. 9
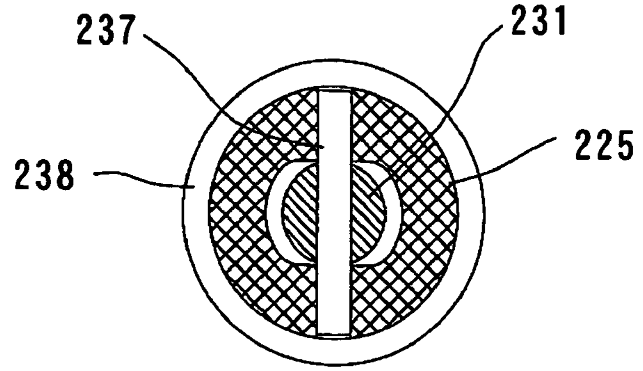
FIG. 10
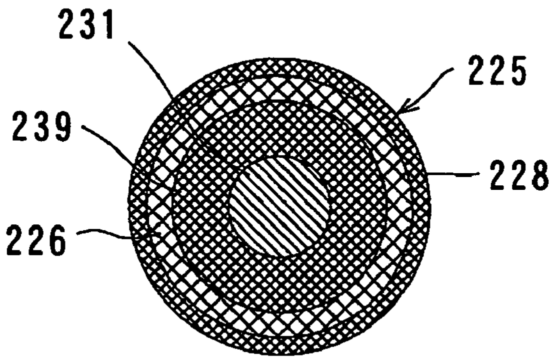
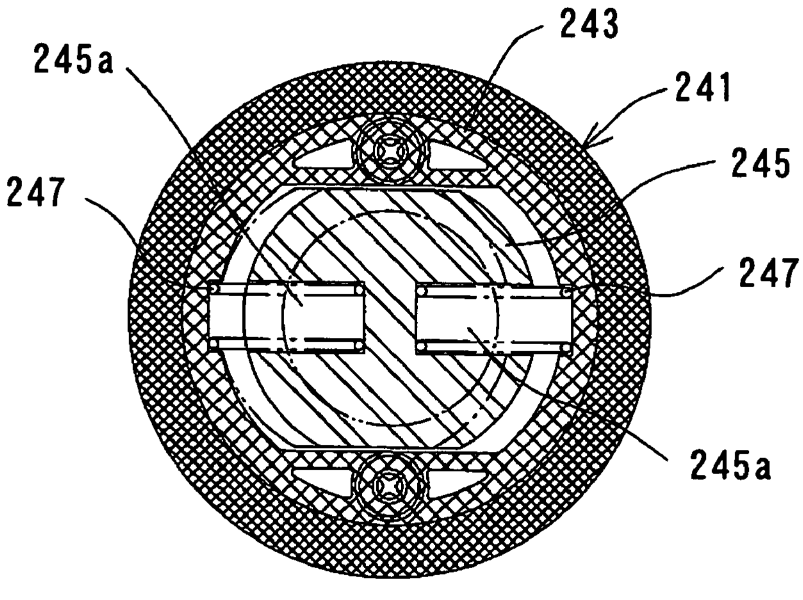
FIG. 11

VIBRATION ISOLATING HANDLE

BACKGROUND OF THE INVENTION

1. Field of the Invention

The present invention relates to a vibration isolating handle attached to a reciprocating power tool such as an electric hammer and a hammer drill, which drives a tool bit at a predetermined cycle.

2. Description of the Related Art

Japanese Laid-Open Utility Model Publication No. 63-6343 discloses an auxiliary operating device, in the form of a vibration isolating handle, which is attached in use to a body of an electric hammer in order to operate the electric hammer. In this prior art reference, a grip is formed by covering a stem with a hard elastic pipe and further covering the hard elastic pipe with a soft elastic pipe.

The above-mentioned grip is designed to reduce vibration by the soft pipe and to prevent deformation by the hard pipe. However, the vibration reducing effectiveness varies according to the force of the user gripping the grip. Thus, stable vibration reducing effectiveness cannot be obtained and further improvement is desired.

SUMMARY OF THE INVENTION

Accordingly, it is an object of the invention to provide a vibration reducing technique which is effective in obtaining stable vibration reducing effectiveness.

According to the present invention, a representative vibration isolating handle may include a body, a grip part and an elastic member. The handle body is provided to be attachable to the power tool. The grip part is connected to the handle body such that the grip part can move relatively with respect to the handle body substantially in the same direction at least as vibration of the power tool. The elastic member is provided between the handle body and the grip part. The elastic member applies a biasing force to the grip part when the grip part moves. According to the invention, vibration of the grip part can be reduced by the vibration absorbing function of the elastic member with stability regardless of whether the force of the user gripping the grip part is large or small.

Other objects, features and advantages of the present invention will be readily understood after reading the following detailed description together with the accompanying drawings and the claims.

BRIEF DESCRIPTION OF THE DRAWINGS

FIG. 9 is a sectional view taken along line B—B in FIG. 8.

FIG. 10 is a sectional view taken along line C—C in FIG. 8.

FIG. 11 is a sectional view taken along line D—D in FIG. 8.

DETAILED DESCRIPTION OF THE INVENTION

Figure 1:
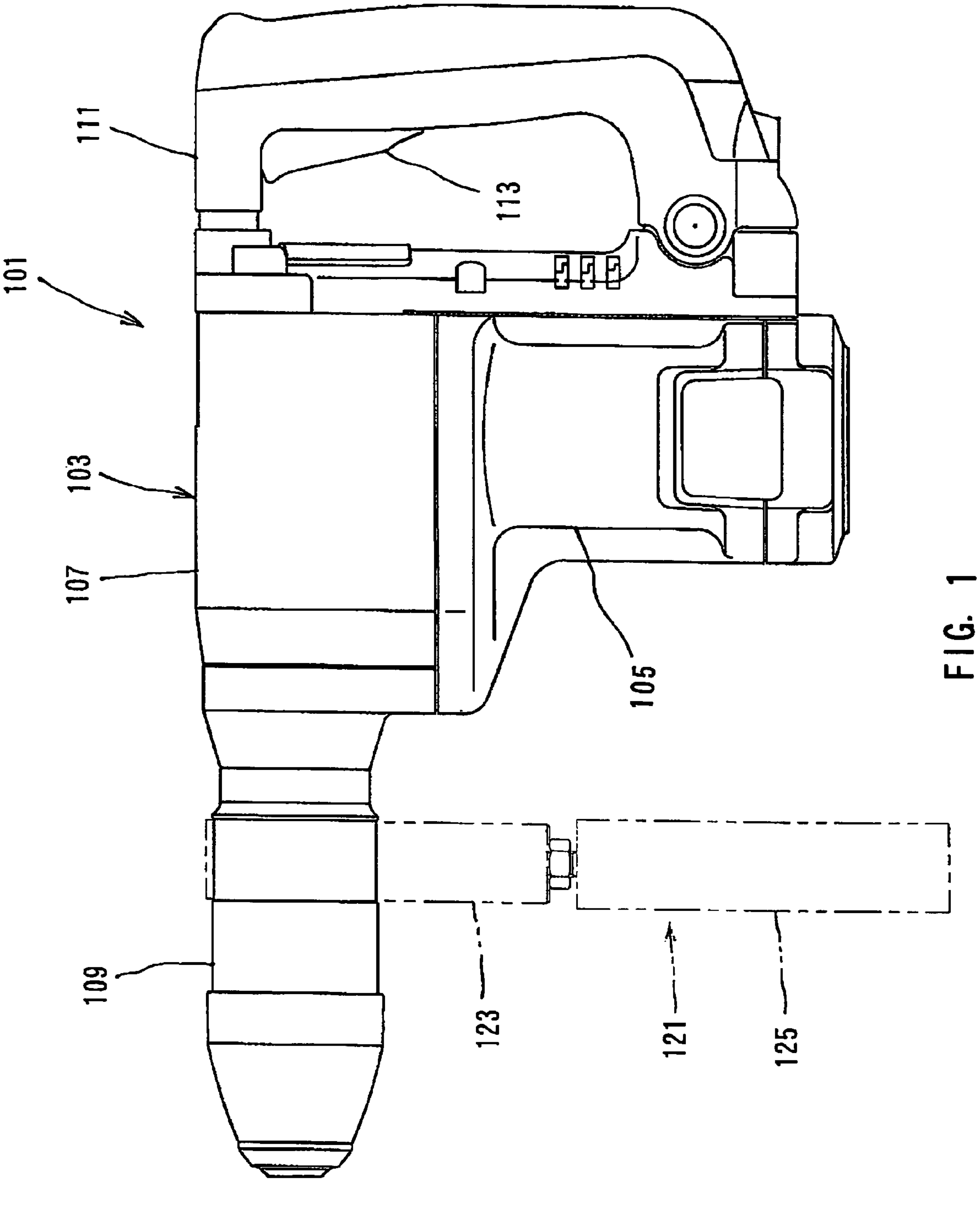
FIG. 1 is a front view showing an entire electric hammer having a vibration isolating handle according to an embodiment of the invention.

According to the present invention, a representative vibration isolating handle may include a handle body attachable to a power tool, a grip part connected to the body such that the grip part can move with respect to the body substantially in the same direction at least as vibration of the power tool, and an elastic member provided between the handle body and the grip part. The elastic member applies a biasing force to the grip part when the grip part moves. The "vibration isolating handle" may be typically applied to a reciprocating power tool in which a tool bit is driven to reciprocate. Further, it may be applied to a power tool in which substantially linear vibration is caused when the tool bit is driven. Preferably, such power tool may include an impact power tool, such as an electric hammer and a hammer drill, which performs a crushing operation or a drilling operation on a workpiece by the axial striking movement or by the axial striking movement and rotation of a tool bit. The power tool may also include a cutting power tool, such as a reciprocating saw and a jigsaw. Moreover, it may also be applied to a rotary power tool which performs a grinding operation on a workpiece by rotating a disc. The grip part may move in a manner that it can move linearly in a direction substantially parallel to the direction of vibration of the power tool or it can pivot in a direction substantially parallel to the direction of vibration.

In use, vibration caused when the power tool is driven is inputted to the grip part of the vibration isolating handle which the user holds. In such case, vibration of the grip part is reduced by the vibration absorbing function of the elastic member. On the other hand, the elastic member is disposed between the body and the grip part, and the force of gripping the grip part does not have a direct influence on the vibration damping effectiveness of the elastic member. Therefore, the vibration damping effectiveness can be obtained with stability regardless of whether the force of the user gripping the grip part is large or small.

As one aspect of the invention, the handle body may include a first clamp element and a second clamp element that can be oppositely disposed to each other in a manner of holding a handle mounting portion of the power tool from the opposite sides and further, may include a locking device that moves the first and the second clamp elements toward each other such that the clamp elements press the power tool from the opposite sides in order to lock the clamp elements to the power tool. The locking device can lock the first and the second clamp elements to the power tool in the state in which the moving direction of the grip part coincides with the direction of vibration. With this construction, the vibration isolating handle can be attached to the power tool such that the moving direction of the grip part coincides with the direction of vibration of the power tool.

Further, as another aspect of the invention, the representative vibration isolating handle may include a handle body attachable to a power tool, a grip part connected to the handle body and a dynamic vibration reducer. The dynamic vibration reducer is preferably provided on at least one of the handle body and the grip part and serves to reduce vibration inputted from the power tool. By providing the dynamic vibration reducer, vibration of the grip part can be reduced with stability regardless of whether the force of the user gripping the grip part is large or small.

Each of the additional features and method steps disclosed above and below may be utilized separately or in conjunction with other features and method steps to provide improved vibration isolating handle and power tools with such handle and method for using such handle, power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

(First Representative Embodiment)

Figure 2:
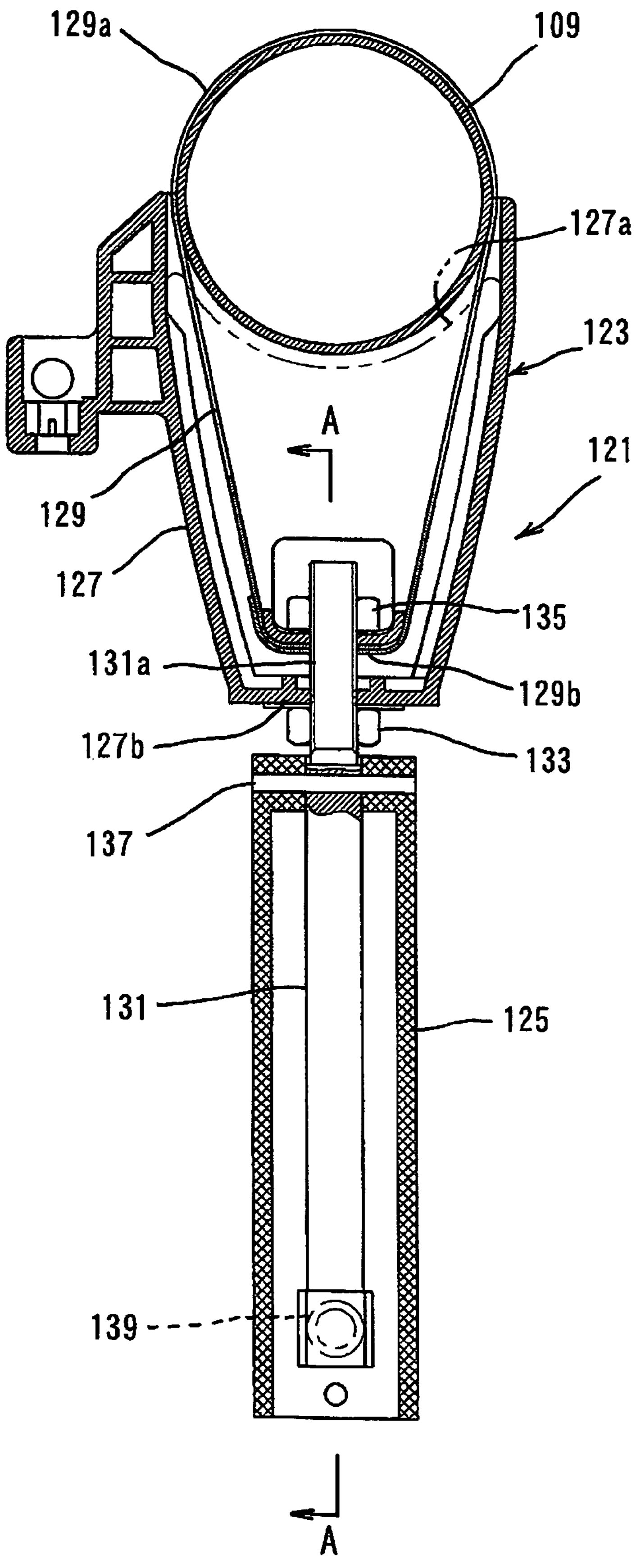
FIG. 2 is a vertical section showing the vibration isolating handle, with a dynamic vibration reducer being removed.
Figure 3:
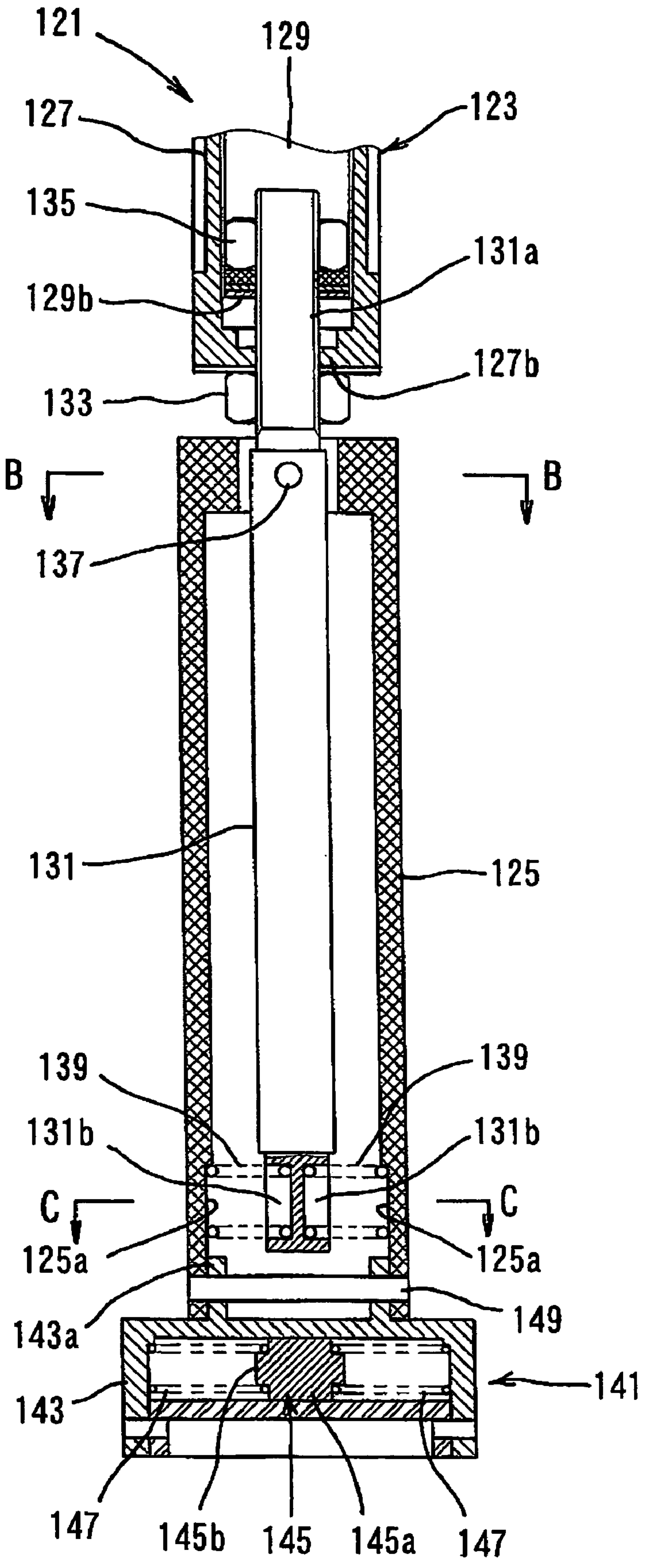
FIG. 3 is a sectional view taken along line A—A in FIG. 2, with the dynamic vibration reducer being attached.
Figure 4:
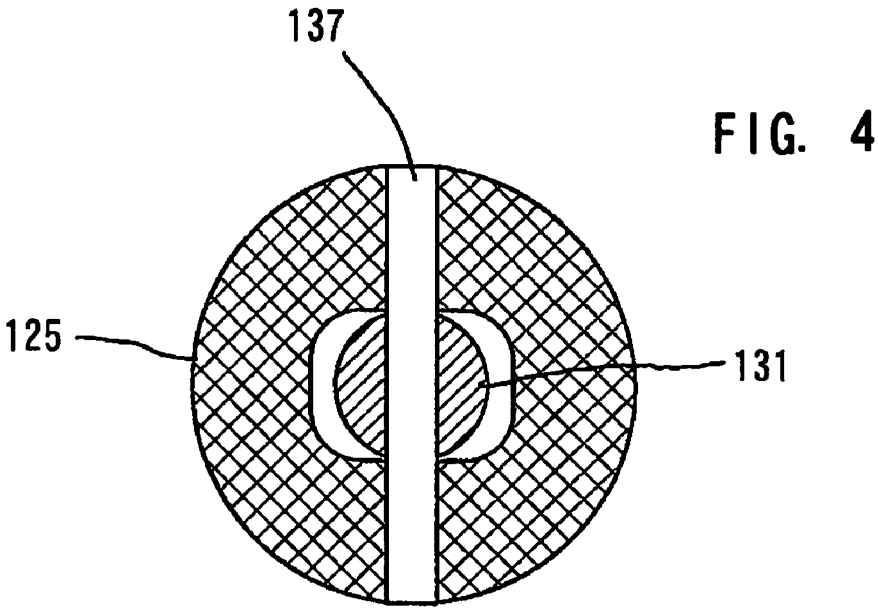
FIG. 4 is a sectional view taken along line B—B in FIG. 3.
Figure 5:
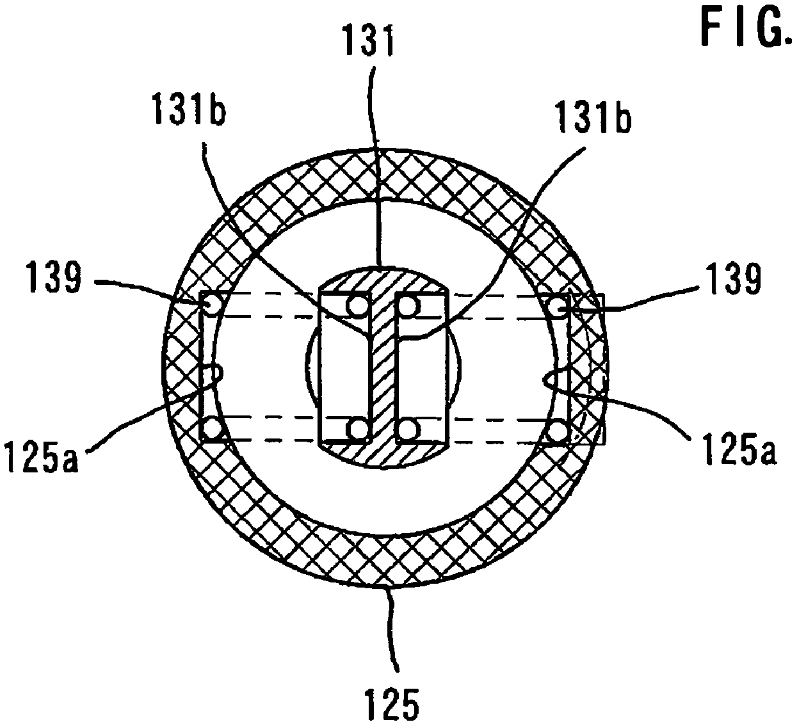
FIG. 5 is a sectional view taken along line C—C in FIG. 3.

An embodiment of the present invention will now be described with reference to the drawings. The embodiment of the present invention will be explained as to a vibration isolating handle when applied as an auxiliary handle for operating an electric hammer which is a representative example of a reciprocating power tool. FIG. 1 shows the entire auxiliary handle attached to an electric hammer, by phantom line. FIGS. 2 and 3 show the auxiliary handle in vertical section. Further, FIGS. 4 and 5 show part of the auxiliary handle in cross section.

First, an electric hammer 101 to which an auxiliary handle 121 is attached will be explained briefly with reference to FIG. 1. The electric hammer 101 mainly includes a body 103 which defines the contours of the electric hammer 101. The body 103 is a feature that corresponds to the "power tool body" according to the present invention. The body 103 includes a motor housing 105, a gear housing 107 and a tool holder (barrel part) 109 which occupies the tip end (front end) region of the gear housing 107. A main handle (handgrip) 111 is mounted on the rear end of the motor housing 105 and the gear housing 107.

Although not particularly shown, an impact driving mechanism is incorporated within the body 103 and serves to strike the tool bit retained by the tool holder 109. The impact driving mechanism includes a crank mechanism that converts rotational motion of a driving motor to reciprocating motion and a striking mechanism that strikes the hammer bit by reciprocating in the longitudinal direction of the body 103 via components of linear motion of the crank mechanism. Within such electric hammer 101, vibration may possibly be caused during operation in the longitudinal direction of the body 103 or the striking direction of the hammer bit. The driving motor is started or stopped by On/Off operation of the power switch by a trigger 113 on the main handle 111.

The auxiliary handle 121 is explained with reference to FIGS. 2 to 5. The auxiliary handle 121 includes a handle body 123 and a grip part 125 which a user holds. The handle body 123 is removably attached to the tool holder 109 (hereinafter referred to as barrel part) of the electric hammer 101. The handle body 123 is a feature that corresponds to the "body" according to the present invention.

As shown in FIG. 2, the handle body 123 includes a mounting member 127, a tightening band 129 and an attaching and removing member 131. The mounting member 127 includes a curved support surface 127*a* which can fit in contact with the lower outside surface of the barrel part 109. The tightening band 129 can press down the upper outside surface of the barrel part 109. The attaching and removing member 131 serves to tighten and loosen the tightening band 129 against the barrel part 109. The mounting member 127 and the tightening band 129 form handle mounting means for mounting the handle body 123 to the barrel part 109. The barrel part 109 is inserted through a substantially cylindrical bore defined by the support surface 127*a* of the mounting member 127 and an upper curved face 129*a* of the tightening band 129. Then the tightening band 129 is tightened so that the mounting member 127 and the tightening band 129 clamp the barrel part 109 from above and below. Thus, the handle body 123 is attached to the barrel part 109.

As shown in FIGS. 2 and 3, the attaching and removing member 131 has a round rod-like shape and includes a threaded portion 131*a* on its one end (upper end). The threaded portion 131*a* loosely extends through a base 127*b* of the mounting member 127 and a lower end portion 129*b* of the tightening band 129 that faces the base 127*b*. A nut 135 engages with the upper end portion of the threaded portion 131*a* and contacts the upper face of the lower end portion of the tightening band 129. The nut 135 on the band side faces the inner surface of the mounting member 127 with a slight clearance, so that the nut 135 is locked against rotation on the band side (see FIG. 3). When the attaching and removing member 131 is rotated in one direction, the nut 135 on the band side is moved downward, so that the tightening band 129 is tightened. Thus, the handle 121 is fixedly attached to the barrel part 109. On the other hand, when the attaching and removing member 131 is rotated in the other direction, the nut 135 on the band side is moved upward, so that the tightening band 129 is loosened. A nut 133 which engages the proximal (lower) portion of the threaded portion 131*a* is a lock nut which holds the tightening band 129 in a tightened state.

As shown in FIGS. 4 and 5, the grip part 125 is cylindrically shaped and is fitted around the attaching and removing member 131. One end (upper end) of the grip part 125 in the longitudinal direction is connected to the handle body 123 via a pivot 137 such that the grip part 125 can rotate substantially around a horizontal axis with respect to the handle body 123. When the handle body 123 is attached to the hammer 101, the direction of rotation of the grip part 125 is adjusted such that it substantially coincides with the longitudinal direction (vibrating direction) of the body 103 of the hammer 101.

Further, on the other end (lower end) of the grip part 125 in the longitudinal direction, metal compression springs 139 are oppositely disposed between the grip part 125 and the attaching and removing member 131 on the opposite sides of the attaching and removing member 131. Each of the compression springs 139 is a feature that corresponds to the “elastic member” according to the present invention. The compression springs 139 serve to absorb vibration in the longitudinal direction of the body 103 inputted into the grip part 125. Specifically, when the grip part 125 rotates with respect to the handle body 123 around the pivot 137 in the longitudinal direction of the body 103, a spring force is applied to the grip part 125 between the grip part 125 and the attaching and removing member 131. Under normal conditions in which vibration is not caused in the body 103, the grip part 125 is held in a position in which it is substantially concentric with the attaching and removing member 131. Recesses 125*a*, 131*b* are formed in the portions of the grip part 125 and the attaching and removing member 131 which the ends of the elastic members 139 in its longitudinal direction (biasing direction) contact. The recesses 125*a*, 131*b* prevent the elastic members 139 from moving in a direction that crosses the biasing direction, so that the elastic members 139 can reliably be held in a stable seated position.

Further, as shown in FIG. 3, a dynamic vibration reducer 141 is removably attached below the elastic members 139 to the lower end of the grip part 125 in the longitudinal direction. FIG. 2 shows the state in which the dynamic vibration reducer 141 is removed. The dynamic vibration reducer 141 is arranged so as to reduce vibration in the longitudinal direction of the body 103 inputted into the grip part 125. The dynamic vibration reducer 141 mainly includes an elongated hollow cylindrical body 143 that extends along the longitudinal direction of the body 103. The cylindrical body 143 is a feature that corresponds to the “body” of the dynamic vibration reducer according to the present invention. A weight 145 is disposed within the cylindrical body 143 and extends in the longitudinal direction of the cylindrical body 143. The weight 145 includes a large-diameter portion 145*a* and a small-diameter portion 145*b*. A biasing spring 147 is disposed on the right and left sides of the large-diameter portion 145*a* of the weight 145. The biasing spring 147 is a feature that corresponds to the “elastic element” according to the present invention. The biasing spring 147 applies a spring force to the weight 145 between the weight 145 and the cylindrical body 143 when the weight 145 moves in the longitudinal direction of the cylindrical body 143.

The dynamic vibration reducer 141 has a ring-like projection 143*a* extending from the upper surface of the cylindrical body 143. The projection 143*a* is fitted into the bore of the grip part 125 through an open lower end. In this state, a mounting screw 149 is transversely inserted through the grip part 125 and the projection 143*a*. Thus, the dynamic vibration reducer 141 is removably attached to the grip part 125 via the mounting screw 149.

The auxiliary handle 121 of the electric hammer 101 is constructed as mentioned above. When the trigger 113 is operated to turn on the power switch and the driving motor is driven, the rotating output of the driving motor is converted into linear motion via the crank mechanism, as mentioned above. Further, the linear motion is transmitted to the hammer bit as striking movement via the striking mechanism including a striker and an impact bolt. Thus, the hammering operation is performed on the workpiece by the hammer bit.

User holds the main handle 111 and the auxiliary handle 121 in order to operate the electric hammer 101. When the hammer bit is driven, impulsive and cyclic vibration is caused in the body 103 in its longitudinal direction when the hammer bit is driven. This vibration is absorbed by the vibration absorbing function of the compression springs 139 when the vibration is inputted from the body 103 into the grip part 125 via the handle body 123 of the auxiliary handle 121. Thus, the vibration in the grip part 125 is reduced.

When the compression springs 139 do not completely absorb the input of the vibration, the dynamic vibration reducer 141 serves to reduce the vibration. Specifically, the weight 145 and the biasing springs 147 which are the vibration reducing elements in the dynamic vibration reducer 141 perform a dynamic vibration reduction in cooperation with respect to the grip part 125 on which a certain external force (vibration) acts. Thus, the vibration of the grip part 125 of the present embodiment can be effectively reduced. The principle of the vibration reduction by the dynamic vibration reducer 141 is well known and therefore will not be described in further detail.

As mentioned above, according to this embodiment, the compression springs 139 are adapted to absorb vibration of the grip part 125, and further, the dynamic vibration reducer 141 is adapted to reduce vibration which has not been absorbed by the compression spring 139. Thus, the effectiveness of reducing vibration of the grip part 125 of the auxiliary handle 121 can be enhanced. Further, the vibration reducing effectiveness can be obtained with stability regardless of whether the force of gripping the grip part 125 is large or small in size.

Further, one end of the grip part 125 in the longitudinal direction is connected to the handle body 123 via the pivot 137 Further, the compression springs 139 and the dynamic vibration reducer 141 are disposed on the other end of the grip part 125 that is remote from the pivot 137. Specifically, the compression springs 139 and the dynamic vibration reducer 141 are arranged in a position in which the amplitude of the grip part 125 is the largest when the grip part 125 rotates around the pivot 137. Thus, the vibration absorbing function of the compression springs 139 and the vibration reducing function of the dynamic vibration reducer 141 can be effectively performed with respect to the vibration which is inputted to the grip part 125 via the handle body 123.

Further, the dynamic vibration reducer 141 can be removed from the grip part 125. Therefore, depending on the operating conditions, the user can appropriately choose whether the hammering operation should be performed with the dynamic vibration reducer 141 being attached to the grip part 125 in order to reduce vibration or with the dynamic vibration reducer 141 being removed so that the hammer has a reduced weight and a slim appearance.

The weight of the weight 145 is appropriately determined according to the vibration reducing performance of the dynamic vibration reducer 141. In this embodiment, the large-diameter portion 145*a* and the small-diameter portion 145*b* form the weight 145 so that the outer dimensions of the weight 145 can be appropriately controlled and the entire weight 145 can be made compact in size. Further, the weight

145 is elongated in the moving direction, so that the weight 145 can move with stability in the longitudinal direction of the cylindrical body 143.

In this embodiment, the dynamic vibration reducer 141 forms a vibration reducing mechanism by using the weight 145 and the biasing springs 147. On the other hand, for example, oil may be charged into the region on the both sides of the large-diameter portion 145*a* of the weight 145 within the cylindrical body 143. With this construction, a damping force can be additionally applied to the weight 145 when the weight 145 moves within the cylindrical body 143. Further, a plurality of dynamic vibration reducers 141 having the weights 145 of varying mass or having the biasing springs 147 of varying spring constant may be provided on the grip part 125. With this construction, vibration of varying frequencies can be effectively reduced.

Further, in this embodiment, both the compression springs 139 as an elastic member and the dynamic vibration reducer 141 are provided to reduce vibration of the auxiliary handle 121. However, either the vibration reducing mechanism by using the elastic member or the vibration reducing mechanism by using the dynamic vibration reducer 141 may be separately provided on the auxiliary handle 121. In this case, when the dynamic vibration reducer 141 is provided on the auxiliary handle 121, the handle body and the grip part 125 of the auxiliary handle 121 may preferably be fixedly connected to or integrally formed with each other. Further, this embodiment has been described with respect to the auxiliary handle 121. On the other hand, it may also be used as a removable main handle for the power tool.

Further, in this embodiment, in order to attach the auxiliary handle 121 to the electric hammer 101, the mounting member 127 is held in abutment with the lower outside surface of the barrel part 109 of the hammer 101. Then, the tightening band 129 is tightened in such a manner that it presses down the upper outside surface of the barrel part 109 against the mounting member 127. Thus, the auxiliary handle 121 is attached to the barrel part 109 in a manner of clamping the barrel part 109. With this construction, it is not necessary to provide a special arrangement for mounting the auxiliary handle 121 on the electric hammer 101. Therefore, the auxiliary handle 121 can be readily applied to other power tools, such as a hammer drill and a reciprocating saw, as well as the electric hammer 101. In FIG. 1, as an example of mounting the auxiliary handle 121 to the electric hammer 101, the grip part 125 is shown positioned substantially right below the barrel part 109. However, with the construction in which the auxiliary handle 121 is attached to the barrel part 109 in a manner of clamping the barrel part 109 as mentioned above, the user can freely change the mounting position of the auxiliary handle 121, for example, such that the grip part 125 is positioned to the side or above the barrel part 109.

Further, although, in this embodiment, the dynamic vibration reducer 141 is removably mounted on the outside of the grip part 125, it may be disposed within the grip part 125. The dynamic vibration reducer 141 may be mounted to the grip part 125 by engagement between a slide groove and a projection or by using a hook-and-loop fastener, instead of using a screw or a clip. Further, other than the construction like this embodiment in which the dynamic vibration reducer 141 is mounted to the grip part 125 such that it completely projects to the outside of the grip part 125, it may be entirely or partly contained within the grip part 125.

Further, in this embodiment, the auxiliary handle 121 has been described as being applied to the electric hammer 101. However, it may be applied to a hammer drill which performs a drilling operation on a workpiece by the axial striking movement and the rotation of a tool bit in the form of a drill bit. In addition to an impact power tool, such as an electric hammer and a hammer drill, it may also be applied to a cutting power tool, such as a reciprocating saw and a jigsaw, which performs a cutting operation on a workpiece by reciprocating a tool bit in the form of a blade.

Moreover, it may also be applied to a rotary power tool, such as a grinder, which performs a grinding operation on a workpiece by rotating a disc. In this case, effective vibration reduction can be achieved with respect to a vibration in one direction among the vibrations caused by grinding operation of the grinder. Typically, a grinding operation of a grinder is performed by moving the disc in the longitudinal direction of the grinder. Therefore, by designing the auxiliary handle 121 according to this embodiment such that the grip part 125 pivots around the pivot 137 in the longitudinal direction of the grinder, effective vibration reduction can be achieved with respect to vibration caused in the longitudinal direction of the grinder during the grinding operation.

Further, the auxiliary handle 121 according to this embodiment is constructed such that the grip part 125 can pivot around one pivot 137 with respect to the handle body 123. Instead, it may be constructed such that the grip part 125 can pivot around a plurality of pivots which cross each other or such that it can pivot around a spherical surface. In such case, an elastic member is arranged to apply a biasing force in the pivoting direction.

Further, in this embodiment, the grip part 125 is connected to the handle body 123 such that it can pivot. Instead, it may be constructed such that the grip part 125 can move linearly in a direction substantially parallel to the direction of vibration. For example, a guide rod or a slide groove may be provided on the handle body 123 and extend in a direction parallel to the direction of vibration. The grip part 125 may be connected to the handle body 123 such that it can slide along the guide rod or the slide groove. In this case, preferably, the elastic member 139 may be disposed near the sliding portion of the grip part 125, so that the stable and smooth movement of the grip part 125 can be ensured.

Further, in this embodiment, the auxiliary handle 121 is mounted to the electric hammer 101 in a manner of clamping it by tightening the tightening band 129. However, it may be mounted to the electric hammer 101 by using a fastening device, such as a screw or a clip.

(Second Representative Embodiment)

Figure 6:
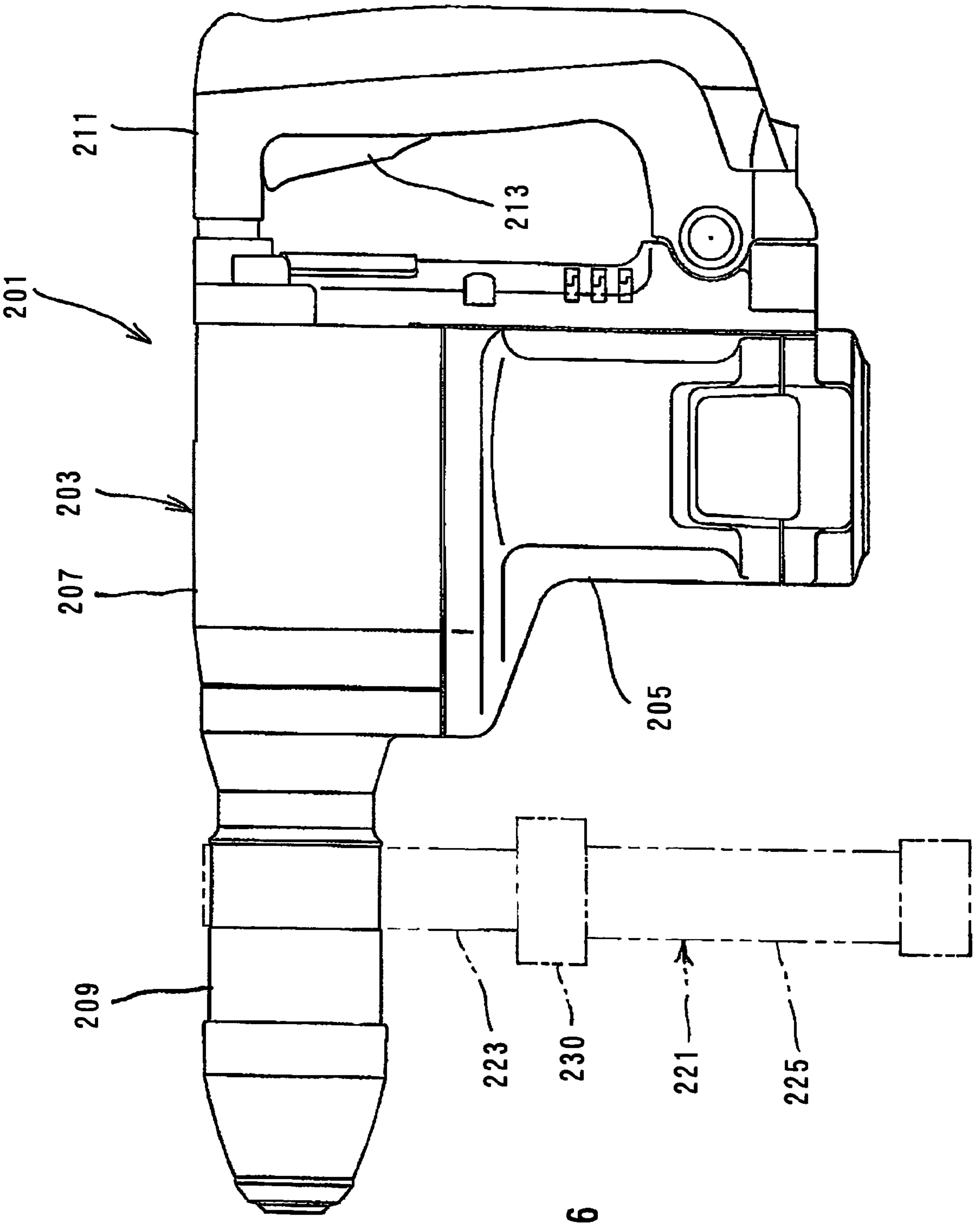
FIG. 6 is a front view showing an entire electric hammer having a vibration isolating handle according to a first embodiment of the invention.
Figure 7:
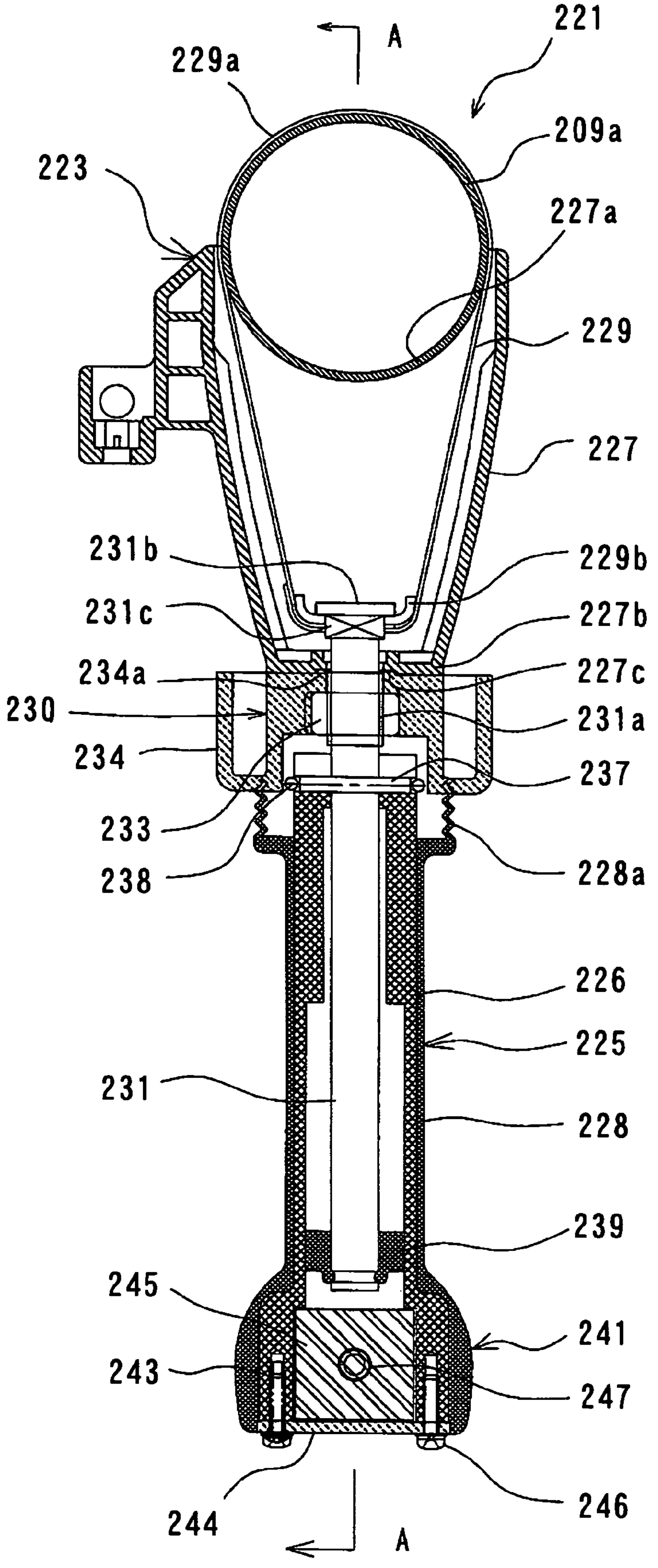
FIG. 7 is a vertical section showing the vibration isolating handle.
Figure 8:
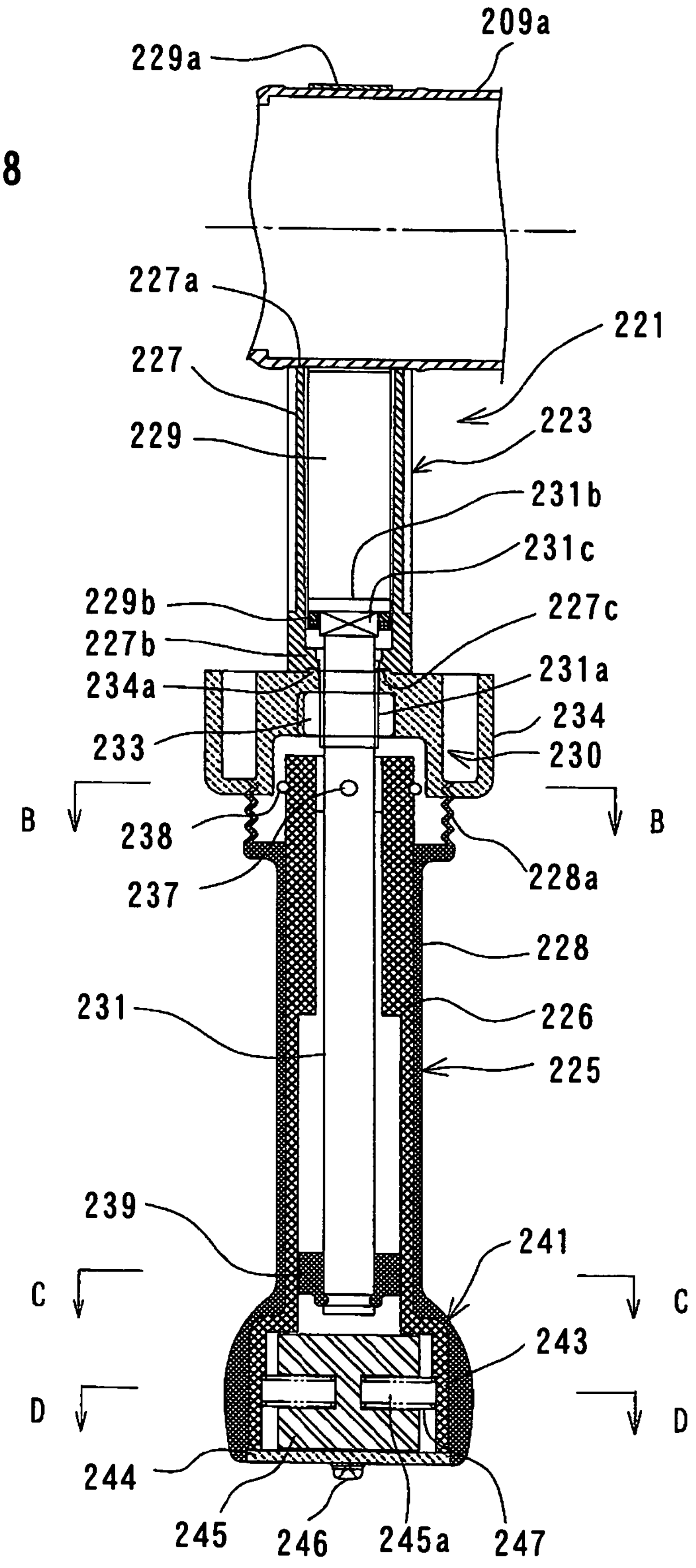
FIG. 8 is a sectional view taken along line A—A in FIG. 7.
Figure 12:
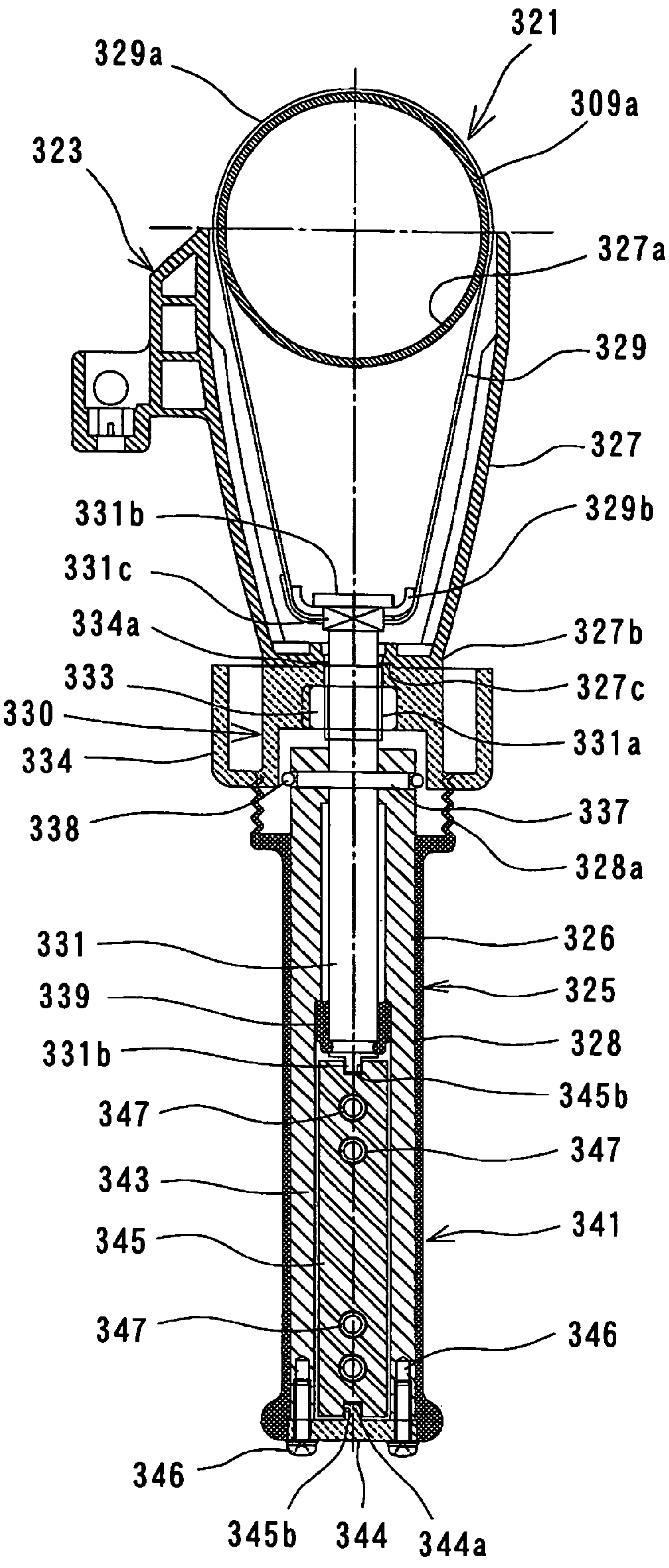
FIG. 12 is a vertical section showing a vibration isolating handle according to a second embodiment of the invention.
Figure 13:
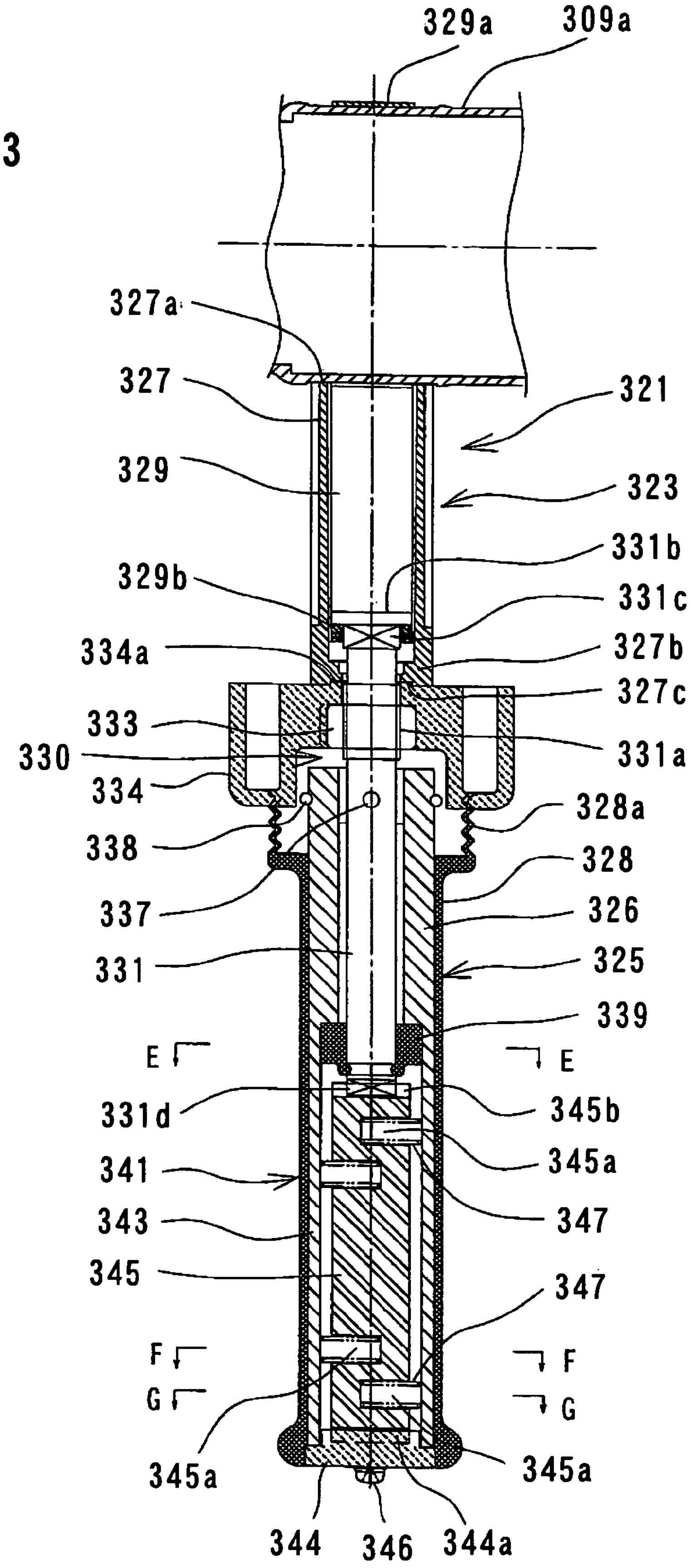
FIG. 13 is a sectional view taken along line E—E in FIG. 12.
Figure 14:
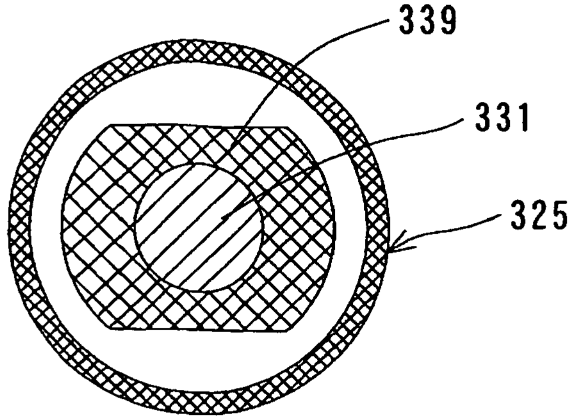
FIG. 14 is a sectional view taken along line F—F in FIG. 13.
Figure 15:
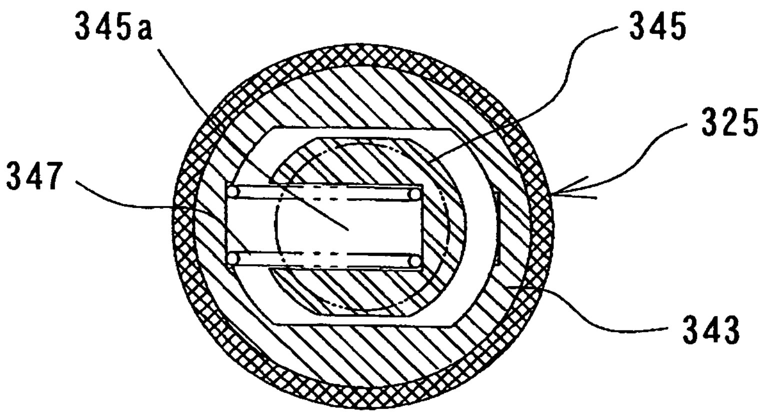
FIG. 15 is a sectional view taken along line G—G in FIG. 13.
Figure 16:
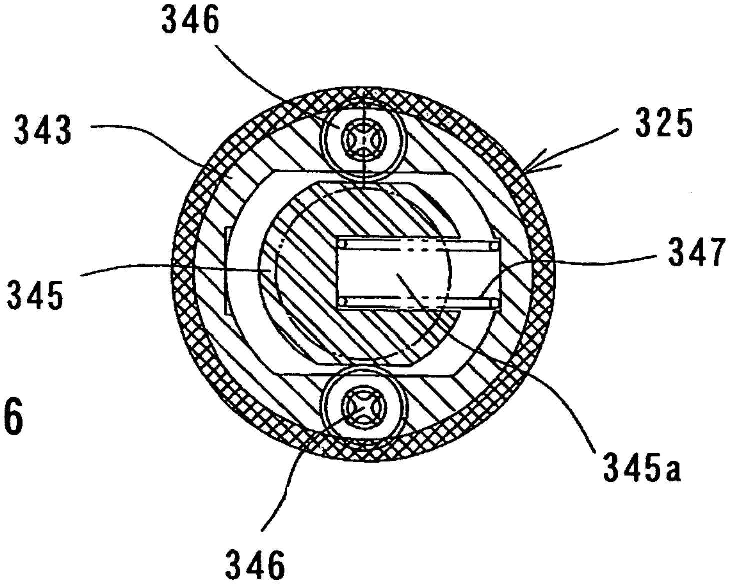
FIG. 16 is a sectional view taken along line H—H in FIG. 13.

Second representative embodiment of the present invention will now be described with reference to FIGS. 6 to 11. FIG. 6 shows the entire auxiliary handle attached to an electric hammer, by phantom line. FIGS. 7 and 8 show the auxiliary handle in vertical section. Further, FIGS. 9 to 11 show part of the auxiliary handle in cross section.

The electric hammer 201 mainly includes a body 203 which defines the contours of the electric hammer 201. The body 203 is a feature that corresponds to the "power tool body" according to the present invention. The body 203 includes a motor housing 205, a gear housing 207 and a tool holder (barrel part) 209 which occupies the tip end (front end) region of the gear housing 207. A main handle (handgrip) 211 is mounted on the rear end of the motor housing 205 and the gear housing 207.

The auxiliary handle 221 includes a handle body 223 and a grip part 225. The handle body 223 is removably attached to a handle mounting portion 209*a* of the tool holder 209 (hereinafter referred to as barrel part) of the electric hammer 201. The handle mounting portion 209*a* includes a circumferential surface having a predetermined constant width in the longitudinal direction of the body 203.

As shown in FIGS. 7 and 8, the handle body 223 comprises a mounting member 227, a tightening band 229 and an attaching and removing mechanism 230 for tightening and loosening the tightening band 229. The mounting member 227 includes a substantially semi-circular support surface 227*a* which can fit in contact with the outer surface (for example, on the lower side) of the handle mounting portion 209*a* of the barrel part 209. The tightening band 229 can press down the outer surface (for example, on the upper side) of the handle mounting portion 209*a*. The attaching and removing mechanism 230 serves to tighten and loosen the tightening band 229. The mounting member 227 and the tightening band 229 form handle mounting means for mounting the handle body 223 to the handle mounting portion 209*a*. The handle mounting portion 209*a* is inserted through a substantially cylindrical bore which is defined by the support surface 227*a* of the mounting member 227 and an upper curved face 229*a* of the tightening band 229. Then, the mounting member 227 and the tightening band 229 clamp the handle mounting portion 209*a* from above and below. Thus, the handle body 223 is fixedly attached to the handle mounting portion 209*a*. The mounting member 227 and the tightening band 229 are features that correspond to the "first clamp element" and the "second clamp element", respectively, in this invention. The attaching and removing mechanism 230 is a feature that corresponds to the "locking device" in this invention.

The attaching and removing mechanism 230 includes a threaded rod 231 and a knobbed nut 233 which engages a threaded portion 231*a* of the threaded rod 231. The threaded rod 231 has a round rod-like shape. One end (upper end) of the threaded rod 231 loosely extends through a base 227*b* of the mounting member 227 and a lower end portion 229*b* of the tightening band 229 which faces the base 227*b*. Further, a head 231*b* is provided on the end of the threaded rod 231 and prevents removal of the threaded rod 231. The threaded rod 231 further has a rectangular shank 231*c* which locks the threaded rod 231 against rotation with respect to the through hole of the tightening band 229. The threaded portion 231*a* is formed on the threaded rod 231 below the rectangular shank 231*c* in its axial direction and extends with a predetermined length. The knobbed nut 233 which engages the threaded portion 231*a* of the threaded rod 231 is fixedly mounted inside a circular knob 234. The knob 234 has an annular projection 234*a* on its upper surface. The projection 234*a* is rotatably fitted into a complementary annular recess 227*c* which is formed on the lower surface of the base 227*b* of the mounting member 227.

With this construction, when the knobbed nut 233 is rotated, the threaded rod 231 is moved in its axial direction, so that the curved face 229*a* of the tightening band 229 which faces the support surface 227*a* of the mounting member 127 can be moved toward or away from the support surface 227*a*. For example, when the knobbed nut 233 is rotated in one direction, the threaded rod 231 moves downward. At this time, the curved face 229*a* of the tightening band 229 is moved toward the support surface 227*a*. As a result, the mounting member 227 and the tightening band 229 clamp the handle mounting portion 209*a* from above and below. Thus, the handle body 223 is fixedly attached to the handle mounting portion 209*a*.

At this time, the support surface 227*a* of the mounting member 227 and the curved face 229*a* of the tightening band 229 are fixedly attached in surface contact to the outer surface of the handle mounting portion 209*a*. The outer circumferential surface of the handle mounting portion 209*a* comprises a circumferential surface parallel to the longitudinal direction of the body 203 (the direction of vibration of the electric hammer 201) as mentioned above. Therefore, the mounting orientation of the handle body 223 (or the member 227 and the tightening band 229) which is fixedly attached to the handle mounting portion 209*a* can be freely changed in the circumferential direction of the body 203 of the electric hammer 201. In the longitudinal direction of the body 203, however, it is always attached in a fixed mounting orientation. When the knobbed nut 233 is rotated in the opposite direction, the threaded rod 231 moves upward and the tightening band 229 is loosened. Thus, the handle body 223 is detached from the handle mounting portion 209*a*.

The other end of the threaded rod 231 extends downward from the mounting member 227 of the handle body 223 and the grip part 225 is mounted on the other end of the threaded rod 231. The grip part 225 includes a cylindrical body 226 and a rubber covering 228 which covers the cylindrical body 226. The grip part 225 is fitted around the threaded rod 231. One end (upper end) of the grip part 225 in the longitudinal direction is connected to the handle body 223 via a pivot 237 such that the grip part 225 can pivot substantially around a horizontal axis (perpendicular to the longitudinal direction of the body 203) with respect to the handle body 223. Specifically, the grip part 225 can pivot substantially in the same direction as vibration of the body 203. The pivot 237 is locked against removal by a lock ring 238 which is fitted around the grip part 225. A dustproof extendable bellows 228*a* is provided on the upper end of the covering 228. The bellows 228*a* covers the space between the grip part 225 and the knob 234 and prevents dust and dirt from entering the sliding surface of the pivot 237 and the engaging surface between the threaded portion 231*a* of the threaded rod 231 and the nut 233.

Further, on the other end (lower end) of the grip part 225 in the longitudinal direction, a ring-like cushion rubber 239 is disposed between the grip part 225 and the threaded rod 231. The cushion rubber 239 is fitted around the threaded rod 231 such that it is prevented from moving in the axial direction. The cushion rubber 239 is a feature that corresponds to the "elastic member" according to the present invention. The cushion rubber 239 serves to absorb vibration in the longitudinal direction of the body 203 which is inputted into the grip part 225. Specifically, when the grip part 225 pivots with respect to the handle body 223 around the pivot 237 in the longitudinal direction of the body 203, a spring force is applied to the grip part 225 between the grip part 225 and the threaded rod 231. Under normal conditions in which vibration is not caused in the body 203, the grip part 225 is held in a position in which it is substantially concentric with the threaded rod 231.

Further, a dynamic vibration reducer 241 is provided below the cushion rubber 239 on the lower end of the grip part 225 in the longitudinal direction. The dynamic vibration reducer 241 is arranged so as to reduce vibration in the longitudinal direction of the body 203 which is inputted into the grip part 225. The dynamic vibration reducer 241 includes a cylindrical body 243, a weight 245 that is disposed within the cylindrical body 243, and a biasing spring 247 that connects the weight 245 and the cylindrical body 243. The cylindrical body 243 and the biasing spring 247 are features that respectively correspond to the "body" of the dynamic vibration reducer and the "elastic element" in the present invention.

The cylindrical body 243 is integrally formed with the grip part 225 on its lower end. The cylindrical body 243 is bulged outward in the radial direction so that a required housing space is ensured. The biasing spring 247 is arranged such that it applies a biasing force in the longitudinal direction of the cylindrical body 243. The biasing spring 247 applies a spring force to the weight 145 between the weight 245 and the cylindrical body 243 when the weight 245 moves in the longitudinal direction of the cylindrical body 243. A recess 245*a* is formed in the weight 245 and receives one end of the biasing spring 247. Thus, the space for the biasing spring 247 is saved. The weight 245 within the cylindrical body 243 is guided with stability along the inner wall surface of the cylindrical body 243 and the inner surface of a bottom plate 244. The bottom plate 244 is mounted on the open end of the cylindrical body 243 by screws 246 in order to close the opening.

To operate the electric hammer 201, user holds the main handle 211 and the auxiliary handle 221. When the hammer bit is driven, impulsive and cyclic vibration is caused in the body 203 in its longitudinal direction when the hammer bit is driven. This vibration is absorbed by the vibration absorbing function of the cushion rubber 239 when the vibration is inputted from the body 203 into the grip part 225 via the handle body 223 of the auxiliary handle 221. Thus, the vibration in the grip part 225 is reduced.

When the cushion rubber 239 does not completely absorb the input of the vibration, the dynamic vibration reducer 241 serves to reduce the vibration. Specifically, the weight 245 and the biasing springs 247 perform a dynamic vibration reduction in cooperation with respect to the grip part 225 on which a certain external force (vibration) acts. Thus, the vibration of the grip part 225 of the present embodiment can be effectively reduced.

In the auxiliary handle 221, the grip part 225 is rotatably fitted around the threaded rod 231 via the pivot 237. Therefore, when the auxiliary handle 221 is attached to the body 203 of the electric hammer 201 such that the grip part 225 pivots in the direction of vibration, the vibration absorbing function of the cushion rubber 239 in the grip part 225 and the vibration reducing function of the dynamic vibration reducer 241 can be most effectively performed.

In this embodiment, the auxiliary handle 221 is fixedly attached to the electric hammer 201 not by rotating the threaded rod 231 but by rotating the knobbed nut 233. Therefore, the auxiliary handle 221 can be locked to the electric hammer with the grip part 225 being always pointed in a fixed direction. In this state, the support surface 227*a* of the mounting member 227 and the curved face 229*a* of the tightening band 229 are in surface contact with the outer surface of the handle mounting portion 209*a* which extends parallel to the direction of vibration. Thus, the direction of rotation of the grip part 225 coincides with the direction of vibration. As a result, the direction of rotation of the grip part 225, the vibration damping direction of the cushion rubber 239, and the vibration reducing direction of the dynamic vibration reducer 241 can be adjusted to coincide with the direction of vibration.

Further, the handle mounting portion 209*a* of the barrel part 209 is inserted through a cylindrical bore which is defined by the support surface 227*a* of the mounting member 227 and the curved face 229*a* of the tightening band 229. Then, the knobbed nut 233 is rotated so that the handle mounting portion 209*a* is clamped by the support surface 227*a* of the mounting member 227 and the curved face 229*a* of the tightening band 229. Thus, the handle body 223 is fixedly attached to the handle mounting portion 209*a* and as a result, the auxiliary handle 221 can be readily attached to the electric hammer 201.

(Third Representative Embodiment)

Third embodiment of the present invention will now be described with reference to FIGS. 12 to 16. This embodiment is a modification to the assembling structure of the dynamic vibration reducer 341 of the auxiliary handle 321 according to the second embodiment. In the third embodiment, the dynamic vibration reducer 341 is constructed by using about the half of the region of the grip part 325 on the side remote from the pivot 337 in the longitudinal direction of the grip part 325. The weight 345 of the dynamic vibration reducer 341 is elongated in the axial direction of the grip part 325. The weight 345 is disposed within the cylindrical body 343 such that the length direction of the weight 345 coincides with the longitudinal direction of the cylindrical body 343. The cylindrical body 343 is defined by about the half of the region of the cylindrical body 326 of the grip part 325. The weight 345 can move in a direction parallel to the longitudinal direction of the body 303. The cylindrical body 343 is a feature that corresponds to the "body" of the dynamic vibration reducer in the present invention. The biasing spring 347 is arranged within the cylindrical body 343 such that it applies a biasing force in a direction parallel to the longitudinal direction of the body 303. When the weight 345 moves, the biasing spring 347 applies a spring force to the weight 345 between the weight 345 and the cylindrical body 343. The biasing spring 347 is a feature that corresponds to the "elastic element" in the present invention.

Two each of the biasing springs 347 are disposed on the front side and rear side of the weight 345 in the moving direction. One end of each of the biasing springs 347 are received in the associated recess 345*a* of the weight 345. Thus, the weight 345 can move with stability in balance. Further, U-shaped grooves 345*a*, 345*b* are formed on the ends of the weight 345 in its length direction. The groove 345*a* engages with a projection 331*d* formed on the end of the threaded rod 331. The groove 345*b* engages with a projection 344*a* of the base plate 344 mounted on the open end of the cylindrical body 343 by screws 146 in order to close the opening. At this time, the both grooves 345*a*, 345*b* can slide. With this construction, the elongated weight 345 can be moved with stability in a direction perpendicular to the length direction of the weight 345.

According to this embodiment, the weight 345 is disposed by utilizing the space (bore) within the grip part 325 in the longitudinal direction, so that the grip part 325 can be made slimmer.

(Fourth Representative Embodiment)

Figure 17:
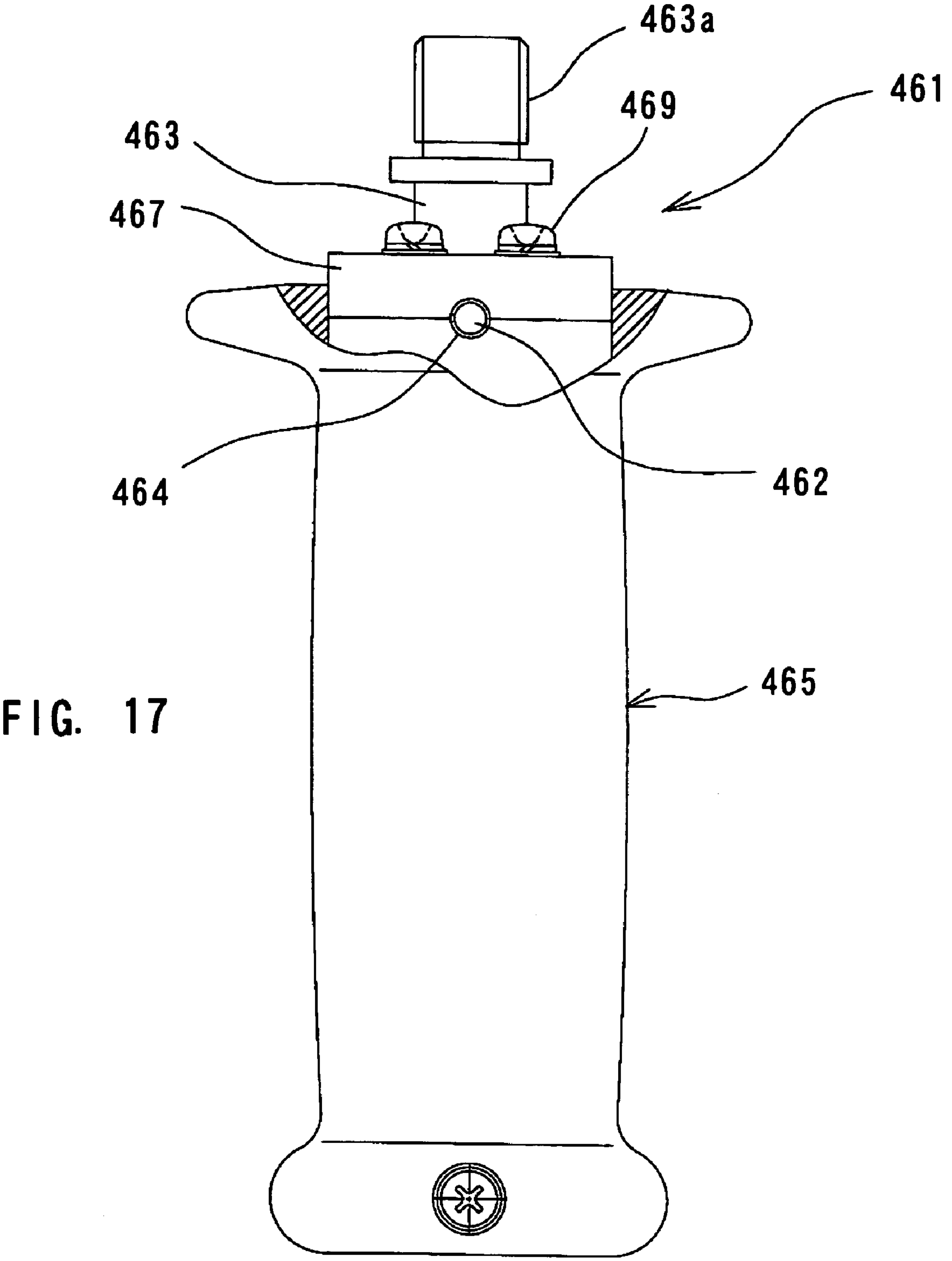
FIG. 17 is an external view, partly broken apart, showing a vibration isolating handle according to a third embodiment of the invention.
Figure 18:
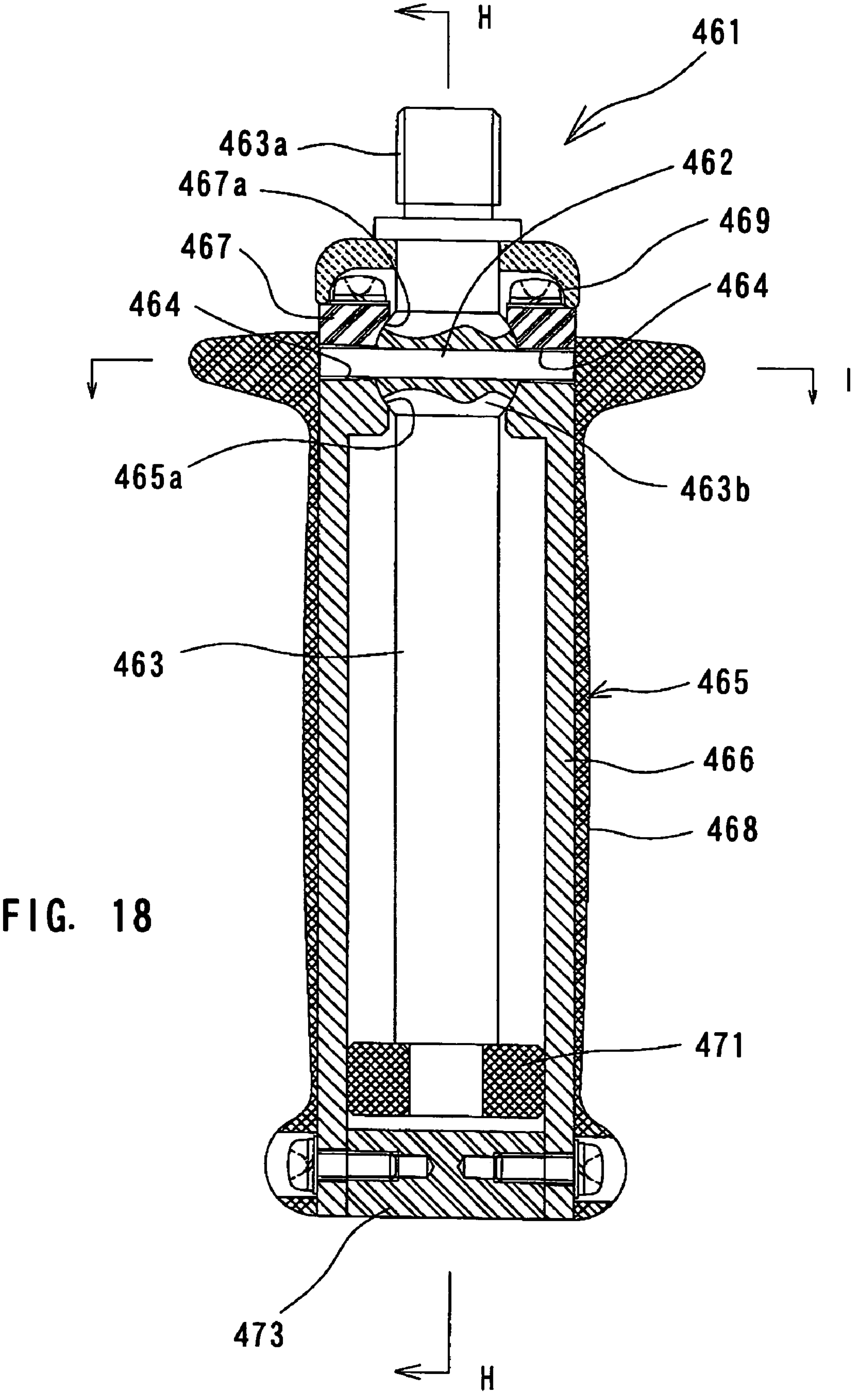
FIG. 18 is a vertical section of FIG. 17.
Figure 19:
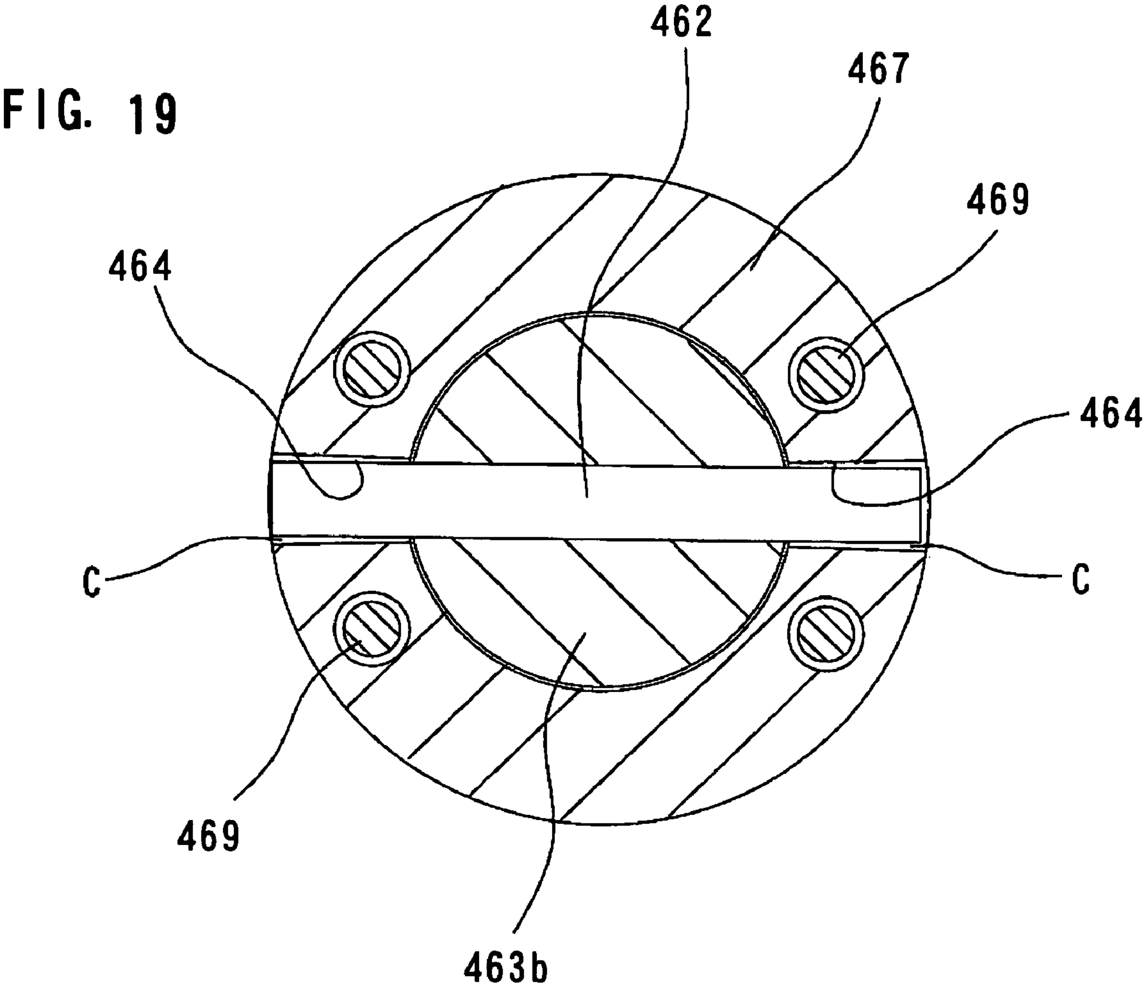
FIG. 19 is a sectional view taken along line I—I in FIG. 18.

A vibration insulating handle according to fourth embodiment of the present invention will now be described with reference to FIGS. 17 to 19. The vibration insulating handle according to this embodiment is suitably applied as an auxiliary handle to a rotary power tool that performs an operation on a workpiece by rotating a tool bit. The rotary power tool embraces a power tool such as a grinder, a circular saw and a vibratory drill, in which vibration is caused in varying directions. Representative auxiliary handle 461 according to this embodiment includes a handle body in the form of a cylindrical mounting rod 463 which can be attached to a body of a power tool, and a grip part 465 the user holds. A threaded mounting portion 463*a* and a spherical portion 463*b* are formed on one end portion of the mounting rod 463 in its axial direction. The mounting rod 463 is inserted into the cylindrical grip part 465. The spherical portion 463*b* is fitted in a spherical concave surface 465*a* on the end of the grip part 465 in its longitudinal direction and in a spherical concave surface 467*a* of an end plate 467. Thus, the grip part 465 can pivot with respect to the mounting rod 463 in all directions around the center of the spherical portion 463*b*. The end plate 467 is fastened to the end surface of the grip part 465 by screws 469.

A stopper pin 462 is inserted (press-fitted) into the spherical portion 463*b* and serves to limit the range of rotation of the grip part 465 with respect to the mounting rod 463. The stopper pin 462 extends through the spherical portion 463*b* in a direction perpendicular to the longitudinal direction of the mounting rod 463, passing through the center of the spherical portion 463*b*. Semi-circular tapered grooves are formed on the end surfaces of the grip part 465 and the end plate 467 which face each other. The semi-circular tapered grooves are disposed oppositely to each other and define a conical hole 464 having a substantially conical shape (tapered on the side facing to the spherical portion 463*b*). Thus, a predetermined clearance C is provided between the inner circumferential surface of the conical hole 464 and the stopper pin 462 which extends between the grip part 465 and the end plate 467 through the spherical portion 463*b*. In this manner, the grip part 465 is connected to the mounting rod 463 such that the grip part 465 can pivot with respect to the mounting rod 463 in all directions around the center of the spherical portion 463*b* within the range of the clearance C provided between the inner circumferential surface of the conical hole 464 and the outer circumferential surface of the stopper pin 462. The stopper pin 462 pivots in line contact with the inner circumferential surface of the conical hole 464. Thus, stable pivotal movement can be secured.

On the other end of the mounting rod 463 in the longitudinal direction, a cushion rubber 471 is disposed between the grip part 465 and the mounting rod 463. The cushion rubber 471 is a feature that corresponds to the "elastic member" according to the invention. The cushion rubber 471 serves to absorb vibration inputted into the grip part 465. Specifically, when the grip part 465 pivots with respect to the mounting rod 463 around the spherical portion 463*b*, a spring force is applied to the grip part 465 between the grip part 465 and the mounting rod 463. The grip part 465 includes a cylindrical body 466 and a rubber covering 468 which covers the cylindrical body 466. The covering 468 also covers the axial end surfaces of the stopper pin 462. The stopper pin 462 is secured by press-fitting into the spherical portion 463*b* of the mounting rod 463. Further, the covering 468 which covers the axial end surfaces of the stopper pin 462 can also serve to prevent removal of the stopper pin 462. Moreover, a cap 473 is mounted to close the open end of the bore of the grip part 465.

The auxiliary handle 461 according to this embodiment is constructed as described above and is attached (locked) in use to an electric grinder. In order to attach the auxiliary handle 461 to an electric grinder, the threaded mounting portion 463*a* of the mounting rod 463 is threadingly engaged into a threaded boss 475*a* of a body 475 of the grinder. With the auxiliary handle 461, vibration caused during the grinding operation of the grinder is absorbed by the vibration absorbing function of the cushion rubber 471 when the vibration is inputted into the grip part 465 via the mounting rod 463 of the auxiliary handle 461. Thus, the vibration of the grip part 465 is reduced. The grip part 465 can pivot in all directions with respect to the mounting rod 463 via the spherical support structure. Therefore, the vibration absorbing function can be reliably performed with respect to vibration inputted from various varying directions. The auxiliary handle 461 is not subject to constraints of the orientation when mounted to the body 475. Thus, the auxiliary handle 461 can be mounted to the body 475 with a simple and cost-effective arrangement by threadingly engaging the threaded mounting portion 463*a* into the threaded hole.

Besides the above-described embodiments, a plurality of dynamic vibration reducers having the weight of varying mass or having the biasing springs of varying spring constant may be provided on the grip part. With this construction, vibration of varying frequencies can be effectively reduced.

Further, besides the above-described embodiments, the invention can be applied to a removable main operating device for the power tool, as well as an auxiliary operating device. Further, the dynamic vibration reducer may be removably mounted on the outside of the grip part. In this case, the dynamic vibration reducer may be mounted to the grip part by engagement between a slide groove and a projection or by using a hook-and-loop fastener, as well as by using a screw or a clip. Further, the dynamic vibration reducer 141 may be mounted to the grip part such that it completely projects to the outside of the grip part or such that it is entirely or partly contained within the grip part.

Figure 20:
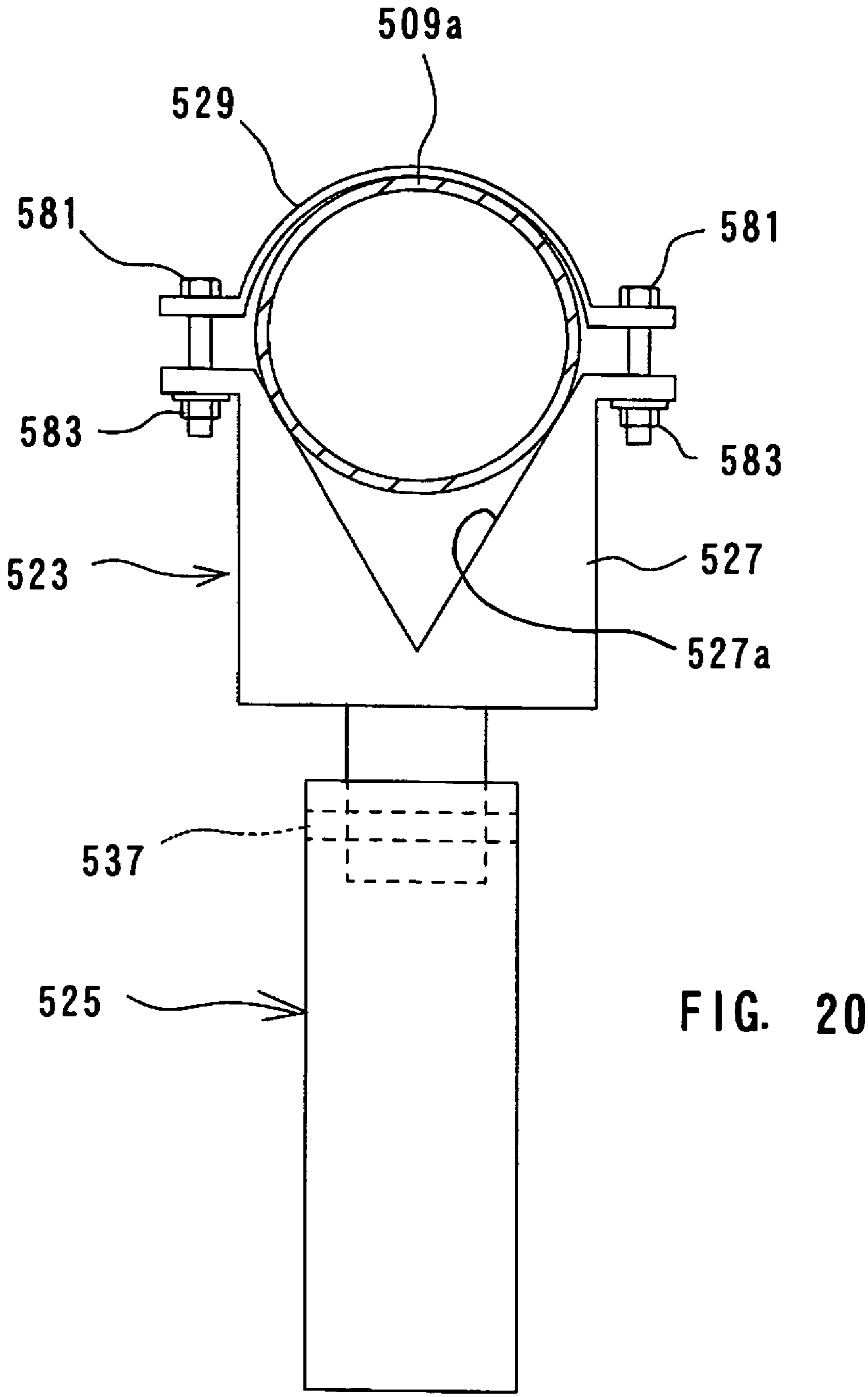
FIG. 20 is a schematic view showing a modification in the manner of mounting the auxiliary handle to a power tool.

Further, although in the above embodiments, the grip part is connected to the threaded rod, it may be connected to the mounting member as schematically shown in FIG. 20. In a modification as shown in FIG. 20, the grip part 525 may have both the vibration reducing mechanism by using the elastic member such as the cushion spring 539 and/or the dynamic vibration reducer 541. The grip part 525 may be connected to the mounting member 527 which forms the hammer body 523 and serves as one clamp element. A support surface 527*a* of the mounting member 527 is V-shaped. In order to attach the auxiliary handle to the power tool, the support surface 527*a* of the mounting member 527 is held in abutment with the handle mounting portion 509*a* of the power tool, and the tightening band 529 is placed oppositely to the mounting member 527 on the handle mounting portion 509*a*. Then, the tightening band 529 is tightened to the mounting member 527 by using fastening means which comprise bolts 581 and nuts 583. Thus, the auxiliary handle is attached to the handle mounting portion 509*a* of the power tool. The grip part 525 is connected to the mounting member 527 via the pivot 537 such that the grip part 525 can pivot in a direction perpendicular to the longitudinal direction of the handle mounting portion 509*a*. With this construction, the auxiliary handle can be attached to the power tool such that the grip part 525 moves in the direction of vibration of the power tool. Therefore, the vibration damping effectiveness of the elastic member and/or the vibration reducing effectiveness of the dynamic vibration reducer can be sufficiently obtained.

DESCRIPTION OF NUMERALS

101 electric hammer (reciprocating power tool)
103 body
105 motor housing
107 gear housing
109 tool holder (barrel part)
111 main handle
113 trigger
121 auxiliary handle
123 handle body
125 grip part
125*a* recess
127 mounting member
127*a* support surface

127*b* base

129 tightening band

129*a* upper curved face

129*b* lower end portion

131 attaching and removing member

131*a* threaded portion

131*b* recess

133 nut on the mounting member side

135 nut on the band side

137 pivot

139 compression spring (elastic member)

141 dynamic vibration reducer

143 cylindrical body ("body" of the dynamic vibration reducer)

143*a* projection

145 weight

147 biasing spring

149 mounting screw

What we claim is:

1. A vibration isolating handle comprising:

a handle body attachable to a power tool, the power tool having a body, a motor housing, a gear housing and a tool holding device, a grip part, a pivot that connects the grip part to the handle body, wherein the pivot allows the grip part to rotate relative to the handle body around the pivot when vibration of the power tool is transmitted to the grip part via the handle body, and an elastic member provided within the grip part at a region other than the pivot, the elastic member applying a biasing force to the grip part when the grip part rotates relative to the handle body around the pivot when vibration of the power tool is transmitted to the grip part via the handle body.

2. The vibration isolating handle as defined in claim 1, wherein the grip part is connected to the handle body such that the grip part pivots in a first direction that is substantially parallel to a direction of vibration and wherein the elastic member applies a biasing force to the grip part when the grip part pivots in said first direction.

3. The vibration isolating handle as defined in claim 1, wherein the grip part is connected to the handle body such that the grip part pivots in a first direction that is substantially parallel to a direction of vibration and wherein the elastic member applies a biasing force to the grip part when the grip part pivots in said first direction, wherein the elastic member is disposed in a position remote from a pivot around which the grip part pivots with respect to the handle body.

4. The vibration isolating handle as defined in claim 1 further comprising a dynamic vibration reducer provided on the grip part in an outer region of the pivot for reducing vibration inputted from the power tool.

5. The vibration isolating handle as defined in claim 1 further comprising a dynamic vibration reducer provided on the grip part for reducing vibration inputted from the power tool, wherein the dynamic vibration reducer is disposed in a position remote from a pivot around which the grip part pivots with respect to the handle body.

6. The vibration isolating handle as defined in claim 4, wherein the dynamic vibration reducer comprises a housing body, a weight disposed within the housing body and an elastic element that connects the weight and the housing body, the dynamic vibration reducer being removably attached to the grip part.

7. The vibration isolating handle as defined in claim 1, wherein the handle body comprises:

first and second clamp elements oppositely disposed to each other in a manner of holding a handle mounting portion of the power tool from opposite sides and a locking device that moves the first and the second clamp elements toward each other such that the clamp elements press the power tool from the opposite sides, thereby locking the clamp elements to the power tool, wherein the locking device locks the first and the second clamp elements to the power tool in a state in which the moving direction of the grip part coincides with the direction of vibration.

8. The vibration isolating handle as defined in claim 7, wherein the locking device comprises a threaded rod and a nut, the threaded rod is connected to the first clamp element, the grip part is connected to the threaded rod, the nut is connected to the first clamp element and engages a threaded portion of the threaded rod, wherein the locking device moves the first and the second clamp elements toward and away from each other by rotating the nut, thereby attaching and removing the first and the second clamp elements to and from the power tool.

9. The vibration isolating handle as defined in claim 7, wherein the grip part is connected to the handle body such that the grip part pivots in a first direction that is substantially parallel to a direction of vibration and wherein the elastic member applies a biasing force to the grip part when the grip part pivots in said first direction.

10. The vibration isolating handle as defined in claim 9, wherein the elastic member is disposed in a position remote from a pivot around which the grip part pivots with respect to the handle body.

11. The vibration isolating handle as defined in claim 7 further comprising a dynamic vibration reducer provided on the grip part for reducing vibration inputted from the power tool.

12. The vibration isolating handle as defined in claim 11, wherein the dynamic vibration reducer is disposed in a position remote from a pivot around which the grip part pivots with respect to the handle body.

13. The vibration isolating handle as defined in claim 1, wherein the handle body is attached to the power tool by threadingly engaging a mounting screw provided on one of the handle body and the power tool into a threaded hole that is formed in the other of the handle body and the power tool, wherein the pivot connects the grip part to the handle body such that the pivot allows the grip part to rotate in all directions relative to the handle body around the pivot when vibration of the power tool is transmitted to the grip part via the handle body, and wherein an elastic member is disposed within grip part at a region other than the pivot, and applies a biasing force when the grip part rotates relative to the handle body around the pivot when vibration of the power tool is transmitted to the grip part via the handle body.

14. A power tool comprising:

a body, a motor housing, a gear housing, a tool holding device, a main handle and an auxiliary handle on a body of the power tool, wherein the auxiliary handle includes a handle body attachable to the body of the power tool, a grip part, a pivot that connects the grip part to the handle body, and an elastic member that applies a biasing force to the grip part when the grip part rotates relative to the handle body around the pivot when vibration of the power tool is transmitted to the grip part via the handle body, wherein the pivot allows the grip part to rotate relative to the handle body around the pivot when vibration of the power tool is transmitted to the grip part via the handle body.

15. The power tool as defined in claim 14, further comprising a dynamic vibration reducer provided on the grip part of the auxiliary handle in an outer region of the pivot for reducing vibration inputted from the power tool body.

16. The power tool as defined in claim 14, wherein the handle body includes first and second clamp elements oppositely disposed to each other in a manner of holding a handle mounting portion of the power tool from the opposite sides, and a locking device that moves first and second clamp elements toward each other, wherein the clamp elements press the power tool from the opposite sides, thereby locking the clamp elements to the power tool, and the locking device locks the first and the second clamp elements to the power tool in the state in which the moving direction of the grip part coincides with the direction of vibration.

17. The power tool as defined in claim 16 further comprising a dynamic vibration reducer provided on the grip part of the auxiliary handle in an outer region of the pivot for reducing vibration inputted from the tool body.

18. The power tool as defined in claim 14 wherein the auxiliary handle comprises a handle body and a grip part, the handle body is attached to the power tool by threadingly engaging a mounting screw provided on one of the handle body and the power tool into a threaded hole formed in the other of the handle body and the power tool, wherein the pivot connects the grip part to the handle body such that the pivot allows the grip part to rotate in all directions relative to the handle body around the pivot when vibration of the power tool is transmitted to the grip part via the handle body, and wherein an elastic member is disposed within the grip part at a region other than the pivot, and applies a biasing force when the grip part rotates relative to the handle body around the pivot when vibration of the power tool is transmitted to the grip part via the handle body.

19. A vibration isolating handle comprising a handle body attachable to a power tool, a grip part, a pivot that connects the grip part to the handle body, and a dynamic vibration reducer, wherein the dynamic vibration reducer is provided on at least one of the handle body and the grip part in an outer region of the pivot and serves to reduce vibration inputted from the power tool, wherein the dynamic vibration reducer comprises a housing body, a weight disposed within the housing body and an elastic element that connects the weight and the housing body, the dynamic vibration reducer being removably attached to at least one of the handle body and the grip part.

20. The vibration isolating handle as defined in claim 19, wherein the handle body comprises first and second clamp elements oppositely disposed to each other in a manner of holding a handle mounting portion of the power tool from the opposite sides, and a locking device that moves the first and the second clamp elements toward each other such that the clamp elements press the power tool from the opposite sides, thereby locking the clamp elements to the power tool, wherein the locking device locks the first and the second clamp elements to the power tool such that the vibration reducing direction of the dynamic vibration reducer is substantially parallel to the input direction of the vibration.

21. The vibration isolating handle as defined in claim 20, wherein the dynamic vibration reducer comprises a housing body, a weight disposed within the body and an elastic element that connects the weight and the housing body, the dynamic vibration reducer being removably attached to the grip part.

22. The vibration isolating handle as defined in claim 21, wherein the grip part has a cylindrical shape and the weight is disposed within a cylindrical bore of the grip part such that a length direction of the weight substantially coincides with an axial direction of the bore.

23. The vibration isolating handle as defined in claim 20, wherein the dynamic vibration reducer comprises a housing body, a weight disposed within the housing body and an elastic element that connects the weight and the housing body, the dynamic vibration reducer being removably attached to the grip part.

* * * * *